United States Patent [19]

Koller et al.

[11] Patent Number: 4,480,730
[45] Date of Patent: Nov. 6, 1984

[54] SHOCK ABSORBER UNIT FOR VEHICLES

[75] Inventors: Manfred Koller, Euerbach-Obbach; Hermann Itzinger, Dittelbrunn; Günther Handke, Euerbach; Karl Gottwalt, Schweinfurt; Robert Eusemann, Bergrheinfeld, all of Fed. Rep. of Germany

[73] Assignee: Fichtel & Sachs AG, Fed. Rep. of Germany

[21] Appl. No.: 398,315

[22] Filed: Jul. 15, 1982

[30] Foreign Application Priority Data

Jul. 21, 1981 [DE] Fed. Rep. of Germany ....... 3128723

[51] Int. Cl.³ .............................................. F16F 9/36
[52] U.S. Cl. .................................. 188/315; 29/437; 29/511; 188/322.17; 188/322.19
[58] Field of Search ............... 188/297, 311, 315, 317, 188/318, 322.16, 322.17, 322.19, 322.21; 267/64.15; 29/437, 511; 277/181, 182, 183, 184

[56] References Cited

U.S. PATENT DOCUMENTS

| 2,040,063 | 5/1936 | Padgett | 188/315 |
|---|---|---|---|
| 2,565,617 | 8/1951 | Mercier et al. | 188/315 |
| 2,867,358 | 1/1959 | Meshberg | 29/511 |
| 2,868,336 | 1/1959 | Bliss | 188/317 |
| 3,326,006 | 6/1967 | Mount | 29/511 |
| 3,804,217 | 4/1974 | Keijzer et al. | 188/322.17 |
| 3,958,673 | 5/1976 | Allinquant et al. | 188/315 |
| 4,238,009 | 12/1980 | Wössner et al. | 188/315 |

FOREIGN PATENT DOCUMENTS

| 939784 | 3/1956 | Fed. Rep. of Germany . | |
|---|---|---|---|
| 1171282 | 5/1964 | Fed. Rep. of Germany | 188/317 |
| 7834927 | 3/1979 | Fed. Rep. of Germany . | |
| 7904259 | 6/1979 | Fed. Rep. of Germany . | |
| 2808481 | 9/1979 | Fed. Rep. of Germany | 188/315 |
| 2912902 | 10/1980 | Fed. Rep. of Germany | 267/64.15 |
| 1237989 | 7/1971 | United Kingdom . | |
| 1491251 | 11/1977 | United Kingdom . | |
| 1604244 | 5/1978 | United Kingdom . | |
| 2004348 | 3/1979 | United Kingdom . | |
| 2038255A | 7/1980 | United Kingdom . | |

Primary Examiner—Douglas C. Butler
Assistant Examiner—R. R. Diefendorf
Attorney, Agent, or Firm—Toren, McGeady and Stanger

[57] ABSTRACT

In a shock absorber unit for vehicles of the double-tube type a piston rod guiding member is provided at respective first ends of a cylinder and a container surrounding the cylinder. The first end of the container engagingly surrounds a radially outer face of the piston rod guide member. The container is tube-shaped and has substantially constant wall thickness along its total length. The radially outer surface of the piston rod guiding member is provided with at least one radially inward directed recess or at least one radially outward directed projection. The first end of the container is deformed such as to engage this projection or recess respectively. A sleeve member engagingly surrounds the first end of the container. This sleeve member is also provided with a deformation which deformation is in engagement with the deformation of the container.

11 Claims, 4 Drawing Figures

SHOCK ABSORBER UNIT FOR VEHICLES

SUMMARY OF THE INVENTION

The present invention is directed to a shock absorber unit to be used particularly as an insert for a compression strut. Such a shock absorber unit comprises a cylinder having an axis and first and second ends, respectively, and defining a cavity therein. A piston rod guiding and sealing unit is provided adjacent said first end and includes a piston rod guiding member. A piston unit is provided within the cavity and divides the cavity into two working chambers which are interconnected by valve-controlled passage means. A piston rod is connected to the piston unit within the cavity and extends through the guiding and sealing unit. A substantially cylindrical container having a substantially constant wall thickness along its total length surrounds the cylinder and has first and second ends adjacent said first and second ends of the cylinder, respectively. A compensation chamber is defined between the cylinder and the container. The container is closed at its second end by a bottom wall. A bottom valve unit is provided adjacent the second ends of the cylinder and the container and provides a valve controlled flow passage between the cavity and the compensation chamber. A sleeve member engagingly surrounds the outer face of the container adjacent the first end thereof.

The cylinder is centered and axially fixed between the bottom wall of the container and a substantially axially directed abutment face of the piston rod guiding member. The second end of the container engages a radially outer surface of the piston rod guiding member.

The cavity is filled with a damping liquid, for example, a usual hydraulic oil. The compensation chamber is partially filled with the damping liquid and partially with a gas.

This type of shock absorber units is known, for example, from German Utility Models 78 34 927 and 79 04 259.

In these known embodiments the first end of the container is radially inwardly crimped over an axially directed end face of the piston rod guiding member. A closure cap is pressed over this crimped end of the container in view of forming air outlet passages so that venting of a hollow rubber spring arranged outside the container on the piston rod is rendered possible.

It is further known to form a closure cap as a screw cap. In this case an internal threading of the screw cap engages into an external threading of the container tube and in this way the shock absorber unit is closed. In view of the required mechanical strength both the container tube and the screw cap must be relatively stout-walled, so that the assembly has a relatively high weight. The known shock absorbers, closed by said crimping or screwing method, are disadvantageous especially when the shock absorber is used as an insert of a compression strut, inasmuch as on installation of the insert in the tube of the compression strut the axial securing force is distributed both to the container tube and to the internal cylinder. Accordingly, a great tightening torque is to be exerted onto the securing screw securing the insert within the tube of the compression strut in order to guarantee a satisfactory sealing between the interior of the cylinder and the compensation chamber, as no additional, uncontrolled flow passages must occur between the working chambers and the compensation chamber.

It is the primary object of the present invention to provide a shock absorber unit particularly adapted for use as an insert of a compression strut which possesses reduced weight and allows easy securing of the container to the piston rod guiding member with satisfactory sealing action between the container and the piston rod guiding member.

In accordance with the present invention the radially outer surface of the piston rod guiding member is provided with at least one of radial recesses and radial projections, said container being provided with a deformation facing said recess or projection respectively, both radially and axially, said sleeve member being also provided with a deformation, said deformation of said sleeve member facing said deformation of said container both radially and axially. The deformations in the sleeve member and in the container may be made simultaneously by a single pressing or rolling action after the piston rod guiding member, the container and the sleeve member have been assembled.

The container can be formed as a thin-walled tube, for example, of light metal or plastic material of a wall thickness between 0.5 and 1.5 mm. When such a shock absorber unit is inserted into a compression strut as, for example, shown in U.S. Pat. No. 4,238,009 the container can be easily deformed in axial direction to such an extent that it does not bear a considerable part of the axial force by which the shock absorber unit is axially held between the bottom end of the compression strut tube and the nut engaging the other end of this tube. So the axial force is essentially transmitted only by the cylinder and the cylinder is therefore in satisfactory sealing engagement with both the piston rod guiding member and the bottom wall of the container.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

In FIG. 1 a shock absorber is illustrated which is formed as an insert for a compression strut. Such inserts are installed in compression struts such that a tube of the compression strut (not illustrated) surrounds the container 7 and a securing nut, arranged on the threading of the tube, acts in axial direction upon the piston rod guide 4 (see for example U.S. Pat. No. 4,238,009). The insert is represented as a double-tube shock absorber and consists of the cylinder 1 in which the piston 3, connected with the piston rod 2 and carrying the damping valves, is axially displaceably guided. The interior 30 of the cylinder 1 filled with the damping liquid is divided by the piston 3 into two working chambers 30a, 30b, the lower working chamber 30b being in communication through the bottom valve 6 with the compensation chamber 31 formed between the external diameter of the cylinder 1 and the internal diameter of the container 7. The compensation chamber 31 is partially filled with liquid and partially with gas. The piston rod 2 is guided by the piston rod guide member 4 and sealed off to the exterior by means of the piston rod seal member 5 arranged in the piston rod guide member 4. The cylinder 1 is centered in relation to the container 7 by means of the piston rod guide member 4 and the bottom valve unit 6. The container 7 consists of the container tube 8 and the container bottom 9, and a container bottom stiffening member 10 is arranged between the container bottom 9 and the bottom valve unit 6. The container tube 8 is made with very thin walls and ordinarily consists of metal, preferably aluminum, but can also be produced from synthetic plastics material. The metal embodiment, especially the embodiment with an aluminum tube, has the advantage that the heat generated in the shock absorber is conducted away well. For the connection of the container tube 8 with the piston rod guide member 4 a closure cap 14 is provided which has a cylindrical section 15 and a cover section 16.

Figure 2:
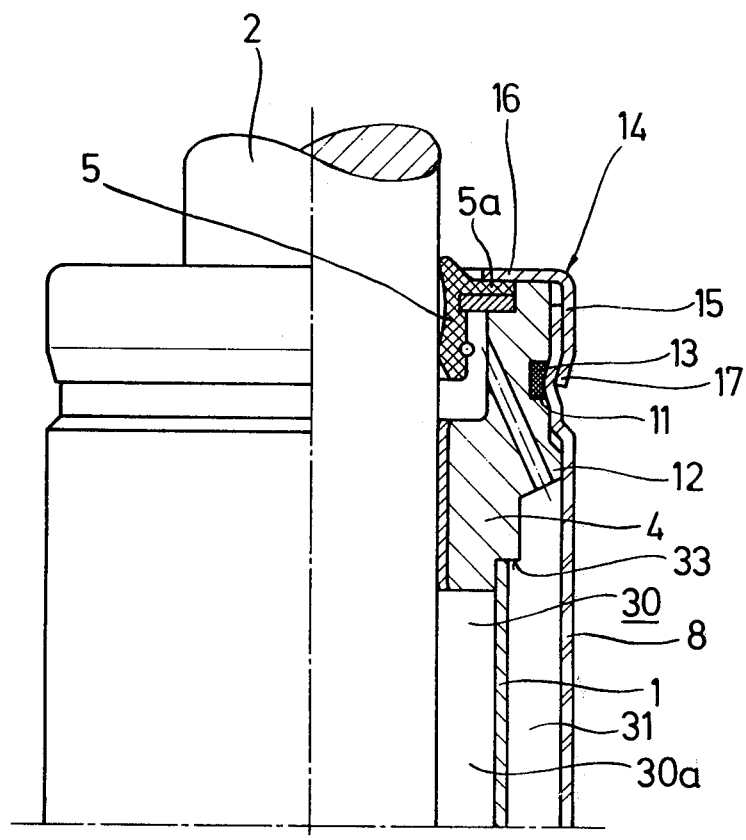
FIG. 2 shows the upper part of the shock absorber according to FIG. 1 in enlarged representation.

The connection of the container tube 8 with the piston rod guide 4 is shown in enlarged representation in FIG. 2. For this purpose the piston rod guide member 4 is provided with a recess 11, which is here formed as a ring groove and receives a gasket 13. Moreover the piston rod guide member 4 comprises projections 12 which are distributed on the circumference or an annular projection formed by an annular bead. In the assembly of the shock absorber the cylindrical end of the container tube 8 is pushed over the substantially cylindrical outer surface of the piston rod guide member 4 such as to create an axial compressive force onto the cylinder 1 and the bottom valve unit 6 between the bottom 9 and the guide member 4. At the same time the closure cap 14 with its cylindrical section surrounds the external face of the container tube 8. By deformation in radially inward direction the cylindrical section 15 of the closure cap 14 and the cylindrical end of the container tube 8 are brought into engagement with the external face of the piston rod guide member 4, for example, by pressing or rolling. Since the cylindrical section 15 of the closure cap 14 terminates in the region of the recess 11 of the guide member 4, this cylindrical section 15 is at the same time provided with a constricted end 17 which has the effect that the container tube 8 is pressed into the recess 11 against the gasket 13. By the cover section 16 of the closure cap 14 the rubber-elastic flange 5a of the piston rod seal member 5 is pressed down so that the piston rod seal member 5 is in sealing engagement with the piston rod guide member 4. Since the container tube 8 is of very thin-walled formation and consists, for example, of an aluminum tube with a wall thickness of from 0.5–1.5 mm, preferably about 0.8 mm, on installation of such an insert the axial force exerted by the screw connection between the tube and the nut of the compression strut is transmitted predominantly from the piston rod guide member 4 through the cylinder 1 to the container bottom 9. The upper end of the cylinder 1 engages an axially directed annular abutment face 33 of the piston rod guide member 4.

Figure 1:
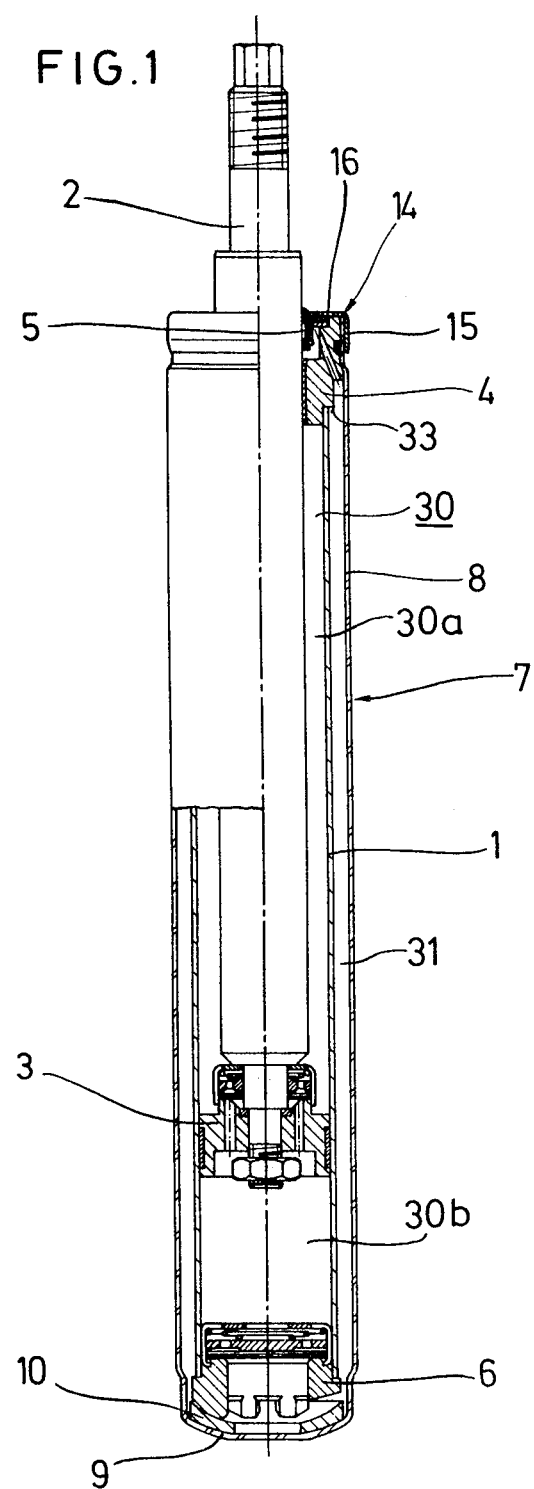
FIG. 1 shows a shock absorber to be used as an insert of a compression strut, in longitudinal section.
Figure 3:
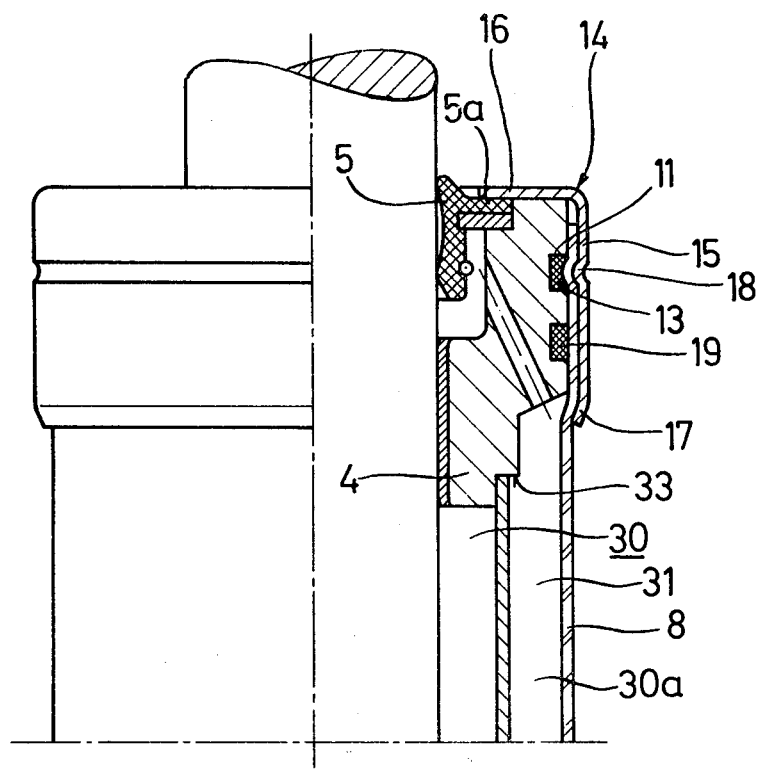
FIG. 3 shows in a representation according to FIG. 2 another embodiment of the connection of the container tube and the piston rod guide member.

The form of embodiment according to FIG. 3 differs from that according to FIGS. 1 and 2 essentially in that the piston rod guide member 4 comprises a substantially cylindrical outer surface for receiving the container tube end 8 and this container tube end is somewhat widened. Besides the recess 11, a further ring groove 19 is provided which likewise accommodates a seal member. The closure cap 14 grasping over the container tube 8 has a cylindrical section 15 which is made slightly longer than the cylindrical engagement face of the piston rod guide member 4. Closing of the container is here likewise effected by deformation in radially inward direction. The container tube 8 is pressed into the recess 11 and against the gasket 13 arranged therein. Depressions are formed at 18 in the region of the recess 11 both in the cylinder 8 and the cylindrical section 15. At the same time a constricted end 17 is formed on the cylindrical section 15 of the closure cap 14 so that in this construction again a very simple securing is achieved. The piston rod seal member 5 is here likewise sealed off by the cover section of the closure cap 14.

Figure 4:
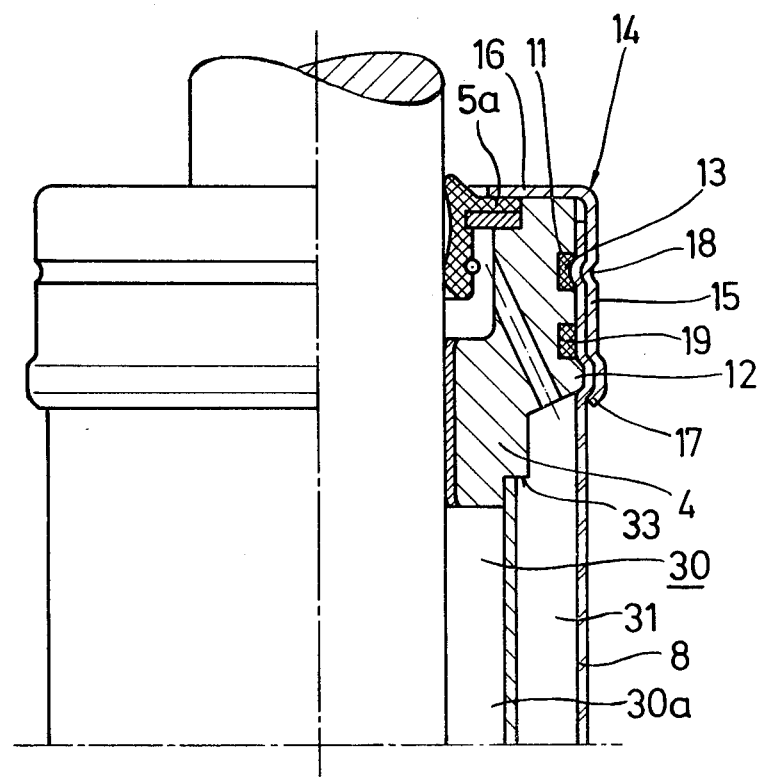
FIG. 4 shows in a representation according to FIGS. 2 and 3 a further embodiment of the connection of the container tube and the piston rod guide member.

FIG. 4 shows a further embodiment of engagement between the container tube 8 on the piston rod guide member 4. In this case the piston rod guide member 4 is provided with a recess 11, with a ring groove 19 and with a projection 12. The widened end of the container tube 8 is pushed over the projection or projections 12 and the adjoining cylindrical outer face of the piston rod guide member 4 and then tightly connected with the piston rod guide member 4 by deformation in radially inward direction simultaneously with a corresponding deformation of the cylindrical section 15 of the closure cap 14. In this operation both the corrugation at 18 and the constriction at 17 grasping over the projection or projections 12 are produced.

With the aid of the closure cap 14 as illustrated in the Figures it is readily possible to produce a satisfactory fastening of a very thin-walled container tube 8 on the piston rod guide member 4, resulting in a satisfactory sealing action between piston rod guide member 4 and container tube 8. The closure cap 14 stiffens the end of the container tube 8 in the connection area in such a way that this tube does not permit the occurrence of any leakage even in operation. The connection with the aid of the closure cap 14 is also suitable for container tubes of synthetic plastics material like polyethylene.

The invention is not limited to the forms of embodiment as illustrated but it is readily conceivable in place of the closure cap 14 to use a simple cylindrical sleeve, especially if, for example, the piston rod seal member 5 is not additionally to be sealed off by such a closure cap 14 with respect to the piston rod guide member 4.

While reference numerals have been inserted in the following claims for a better understanding it is to be noted that these reference numerals are by no means restrictive but only illustrative.

What is claimed is:

1. In a shock absorber unit to be used particularly as an insert for a compression strut comprising a cylinder (1) having an axis and first and second ends, respectively, and defining a cavity (30) therein;

a piston rod guiding and sealing unit (4,5) adjacent said first end of said cylinder and including a piston rod guiding member (4), said piston rod guiding member (4) having an end face axially directed away from said second end of said cylinder and a radially outer surface;

a piston unit (3) within said cavity (30) dividing said cavity (30) into two working chambers (30a, 30b);

a piston rod (2) connected to said piston unit (3) within said cavity (30) and extending through said guiding and sealing unit (4,5);

a substantially cylindrical container (8) having a substantially constant wall thickness along its axial length having first and second ends, respectively, adjacent said first and second ends of said cylinder (1), respectively, and surrounding said cylinder (1) such as to define a compensation chamber (31) outside said cylinder (1), said container (8) being closed at its second end by a bottom wall (9);

a bottom valve unit (6) adjacent said second ends of said cylinder (1) and said container (8) providing a flow passage between said cavity (30) and said compensation chamber (31);

said cylinder (1) being centered and axially fixed between said bottom wall (9) of said container (8) and a substantially axially directed abutment face (33) of said piston rod guiding member (4);

said first end of said container (8) engaging said radially outer surface of said piston rod guiding member (4) and having an axially directed terminal edge at an axial location along said radially outer surface and free of engagement with said piston rod guiding member in axial direction;

a closure cap (14) being provided and including a sleeve member (15) and a cover section (16), said cover section (16) engaging said end face of said piston rod guiding member (4) and said sleeve member (15) engagingly surrounding the radially outer surface of said container (8) adjacent said first end thereof;

said radially outer surface of said piston rod guiding member (4) being provided with at least one of radial recesses (11) and radial projections (12), said container being provided with a deformation facing said one of said recesses (11) and said projections (12), respectively, both radially and axially, said sleeve member (15) being also provided with a deformation (17), said deformation (17) of said sleeve member (15) facing said deformation of said container (8) both radially and axially;

said cavity (30) being filled with a damping liquid;

said compensation chamber (31) being partially filled with said damping liquid and partially with gas.

2. A shock absorber unit as set forth in claim 1, said recesses comprising at least one annular recess (11).

3. A shock absorber unit as set forth in claim 2, said annular recess (11) receiving an annular elastic sealing member (13).

4. A shock absorber unit as set forth in claim 1, said projections comprising at least one annular bead (12).

5. A shock absorber unit as set forth in claim 1, said deformation of said container (8) and said sleeve (15) being made by at least one of a pressing and rolling step after assembling said piston rod guiding member (4), said container (8) and said sleeve member (15).

6. A shock absorber unit as set forth in claim 1, said piston rod guiding member (4) being provided with a recess in said end face, said recess receiving a piston rod sealing member (5), said cover section (16) overlying at least part (5a) of said piston rod sealing member (5).

7. A shock absorber unit as set forth in claim 1, said container (8) being made of light metal like aluminium.

8. A shock absorber unit as set forth in claim 1, said container (8) having a wall thickness of from 0.5 to 1.5 mm.

9. A shock absorber unit as set forth in claim 1, said piston rod guiding member (4) having an end face remote from the first end of said cylinder (1), said first end of said container (8) not extending beyond said end face.

10. A shock absorber unit as set forth in claim 1, said deformation of said container (8) comprising an annular section of a reduced diameter, said deformation of said sleeve (15) being a terminal constriction (17) of said sleeve (15) engaging said section of reduced diameter.

11. In a shock absorber unit to be used particularly as an insert for a compression strut comprising a cylinder (1) having an axis and first and second ends, respectively, and defining a cavity (30) therein;

a piston rod guiding and sealing unit (4,5) adjacent said first end of said cylinder and including a piston rod guiding member (4), said piston rod guiding member (4) having an end face axially directed away from said second end of said cylinder and a radially outer surface;

a piston unit (3) within said cavity (30) dividing said cavity (30) into two working chambers (30a,30b);

a piston rod (2) connected to said piston unit (3) within said cavity (30) and extending through said guiding and sealing unit (4,5);

a substantially cylindrical container (8) having a substantially constant wall thickness along its axial length having first and second ends, respectively, adjacent said first and second ends of said cylinder (1), respectively, and surrounding said cylinder (1) such as to define a compensation chamber (31) outside said cylinder (1), said container (8) being closed at its second end by a bottom wall (9);

a bottom valve unit (6) adjacent said second ends of said cylinder (1) and said container (8) providing a flow passage between said cavity (30) and said compensation chamber (31);

said cylinder (1) being centered and axially fixed between said bottom wall (9) of said container (8) and a substantially axially directed abutment face (33) of said piston rod guiding member (4);

said first end of said container (8) engaging said radially outer surface of said piston rod guiding member (4) and having an axially directed terminal edge at an axial location along said radially outer surface and free of engagement with said piston rod guiding member in axial direction, and the axially directed terminal edge of said cylindrical container (8) is axially spaced from the axially directed end face of said piston rod guiding member (4) directed away from the second end of said cylinder;

a closure cap (14) being provided and including a sleeve member (15) and a cover section (16), said cover section (16) engaging said end face of said piston rod guiding member (4) and said sleeve member (15) engagingly surrounding the radially outer surface of said container (8) adjacent said first end thereof;

said radially outer surface of said piston rod guiding member (4) being provided with at least one of radial recesses (11) and radial projections (12), said container being provided with a deformation facing said one of said recesses (11) and said projections (12), respectively, both radially and axially, said sleeve member (15) being also provided with a deformation (17), said deformation (17) of said sleeve member (15) facing said deformation of said container (8) both radially and axially;

said cavity (30) being filled with a damping liquid;

said compensation chamber (31) being partially filled with said damping liquid and partially with gas.

* * * * *